United States Patent
Xu

(10) Patent No.: US 9,095,153 B2
(45) Date of Patent: Aug. 4, 2015

(54) METHOD OF PREPARING GREEN MILK POWDER

(76) Inventor: Xinyue Xu, Hangzhou (CN)

( * ) Notice: Subject to any disclaimer, the term of this patent is extended or adjusted under 35 U.S.C. 154(b) by 228 days.

(21) Appl. No.: 13/319,503

(22) PCT Filed: Mar. 30, 2011

(86) PCT No.: PCT/CN2011/000546
§ 371 (c)(1),
(2), (4) Date: Mar. 28, 2012

(87) PCT Pub. No.: WO2011/160421
PCT Pub. Date: Dec. 29, 2011

(65) Prior Publication Data
US 2012/0177803 A1 Jul. 12, 2012

(30) Foreign Application Priority Data
Jun. 25, 2010 (CN) .......................... 2010 1 0209623

(51) Int. Cl.
| | | |
|---|---|---|
| *A23C 9/152* | (2006.01) | |
| *A23C 9/15* | (2006.01) | |
| *A23C 9/00* | (2006.01) | |
| *A23C 9/156* | (2006.01) | |
| *A23L 1/00* | (2006.01) | |
| *A23L 1/212* | (2006.01) | |
| *A23C 9/16* | (2006.01) | |
| *A23C 9/158* | (2006.01) | |
| *A23L 2/02* | (2006.01) | |
| *A23L 2/00* | (2006.01) | |
| *A23C 9/18* | (2006.01) | |
| *A23C 1/00* | (2006.01) | |
| *A23C 1/04* | (2006.01) | |
| *A23L 2/38* | (2006.01) | |
| *A23L 2/66* | (2006.01) | |

(52) U.S. Cl.
CPC . *A23C 9/152* (2013.01); *A23C 1/00* (2013.01); *A23C 1/04* (2013.01); *A23C 9/00* (2013.01); *A23C 9/15* (2013.01); *A23C 9/156* (2013.01); *A23C 9/158* (2013.01); *A23C 9/16* (2013.01); *A23C 9/18* (2013.01); *A23L 1/0002* (2013.01); *A23L 1/2121* (2013.01); *A23L 2/00* (2013.01); *A23L 2/02* (2013.01); *A23L 2/38* (2013.01); *A23L 2/66* (2013.01)

(58) Field of Classification Search
CPC ............ A23C 9/00; A23C 9/15; A23C 9/152; A23C 9/156; A23C 9/158; A23C 9/16; A23C 1/00; A23C 1/04; A23C 9/18; A23L 2/00; A23L 2/02; A23L 2/38; A23L 2/66; A23L 1/0002; A23L 1/2121; B02B 1/00; A23V 2250/21
USPC ......... 426/478, 481, 580, 588, 590, 598, 599, 426/615, 618, 629, 640, 385, 464
See application file for complete search history.

(56) References Cited

FOREIGN PATENT DOCUMENTS

| | | |
|---|---|---|
| CN | 1149996 A | 5/1997 |
| CN | 1340317 | 3/2002 |
| CN | 1520731 A | 8/2004 |
| CN | 1709087 | 12/2005 |
| CN | 101574101 | 11/2009 |
| CN | 101669549 | 3/2010 |
| CN | 101703110 | 5/2010 |
| CN | 101856047 | 10/2010 |
| CN | 101856048 | 10/2010 |
| EP | 0504508 A1 | 9/1992 |
| EP | 0547236 A1 | 6/1993 |

OTHER PUBLICATIONS

U.S. Appl. No. 13/319,501, Xinyue Xu, filed Nov. 8, 2011.
Search Report for PCT/CN2011/000546, mailed Jun. 30, 2011, 11 pgs.
Patent Examiner Report No. 1 in Australia Pat. Appl. No. 2011256991.
Wheat grass powder [retrieved on May 8, 2013] Retrieved from internet <URL:http://web.archive.org/web/20080129063233/http://wheatgrasspowder.gojiking.co.uld published on Jan. 29, 2008 as per Wayback Engine. Last paragraph.

*Primary Examiner* — Leslie Wong
(74) *Attorney, Agent, or Firm* — Squire Patton Boggs (US) LLP

(57) ABSTRACT

The invention relates to a method for processing and preparing a green milk powder, comprising the following steps: a. pretreatment: cutting a plant from the position 2-5 cm away from the ground when the tender plant grows to 25-45 cm, washing by tap water to remove soil and impurities on the surface thereof, washing by fresh water after ozone bacteria-killing at room temperature, washing by deionized water, and crushing the tender plant; b. filtering: juicing the obtained crushed tender plant, filtering and taking juice; c. mixing: evenly mixing the juice with raw milk proportionally to prepare into homogenized liquid; d. concentrating: evaporating and concentrating the obtained homogenized liquid by an evaporator to prepare concentrated solution; and e. drying: drying the concentrated solution to prepare into green milk powder. The invention has simple process flow and the processing procedure does not damage thermo-sensitive substances such as vitamin C, chlorophyll, SOD and the like in tender plant.

8 Claims, No Drawings

METHOD OF PREPARING GREEN MILK POWDER

CROSS-REFERENCE

This application is a national phase application of PCT/CN2011/000546 filed on Mar. 30, 2011 which claims priority to Chinese Application No.: 201010209623.1 filed on Jun. 25, 2010, the disclosure of which is incorporated by reference herein in its entirety.

FIELD OF INVENTION

This invention involves in manufacture and preparation of healthful food, especially green milk powder.

BACKGROUND OF INVENTION

In recent years, with the massive international research on human nutrition, the concept of modern food engineering has been proposed. The International Food Science and Technology Meeting held in Sydney, Australian has further highlighted the theme: "natural" and "functionalization" in modern food engineering and emphasized that the modern food technologies should be back to nature. Milk, a natural food richest in nutrition, easy to absorb and inexpensive, is the most "nearly perfect food". People call it "white blood", meaning the ideal natural food. The main proteins in milk are casein, albumin, globulin, and lactoprotein and so on. There are twenty kinds of amino acids in milk including the eight kinds of essential amino acids to human body. Digestibility of milk protein is over 98%. Milk fat is of high-quality; its digestibility is above 95%; and it contains ample fat-soluble or lipophilic vitamins. The lactose in milk is galactose and lactose is easy to digest and absorb. The mineral substances and trace elements in milk are all soluble. The mineral substances, especially calcium and phosphorous, are in good proportion and easy to digest and absorb.

Milk and other dairy products like cheese contain a material called CLA which can break down carcinogenic free radical and heal cell membrane quickly. It plays a role in cancer prevention by defending the body cells from carcinogen invasion. The calcium in milk can break down carcinogen in human's intestinal track and eliminate the harmful substances out of the body. Studies have shown that vitamin A, vitamin B2, vitamin D, etc in milk have the protective effects against carcinomas such as gastric cancer and colon cancer.

There are many kinds of immunoglobulin, antibodies and protective substances in milk, which can strengthen human body's immunity to diseases and also play a role in cancer prevention. And the enzymes in dairy products like yoghurt can protect cancer patients from the side-effect of chemotherapy and radiotherapy treatments.

Milk is full of nutrition. It contains high-quality fat, all kinds of proteins, vitamins, mineral substances, especially the vitamin B, all of which play an important role in skin care by nourishing skin, protecting epidermis, working against cracking and wrinkle, leaving skin smooth, white and soft. It also helps darken hairs and prevent hair loss. The iron, copper and vitamin A in milk help maintain skin beauty and make skin youthful, smooth, and elastic. The whey components in milk have anti-wrinkle function. Milk not only can provide skin with closure oil and form a thin film to prevent moisture evaporation, but also supply skin with moisture temporarily. Therefore, milk is the "nature skin care" and "green skin care".

Natural phytonutrients are extracted from natural green plants and contain a lot of vitamins, mineral substances, nutrients, chlorophyll and active enzymes. Natural phytonutrients can supply all kinds of nutrition that may not be easily obtained or absorbed from daily diet. Natural phytonutrients are safe and reliable to eat and have a high health promoting value without side-effect.

Milk is a common nourishing food and also regarded as the best ideal emulsion for many nutrient substances, medicines and other bioactive components or the carrier of nutrition. Although people have developed many kinds of milk or dairy products which have been enhanced by nutrients, such as fortified calcium, vitamin A, D, taurine, etc., it has not been reported to add natural phytonutrients to milk or any other dairy products.

DESCRIPTION

This invention aims at overcoming the shortcoming of the existing technologies or methods applying to dairy products such as adding fortified calcium, vitamin A, D, taurine, etc into milk. The nutrient substances in these existing milk products are lack of green color and real natural phytonutrients from green plants which can be easily absorbed by all age groups of people, particularly children and senior people. And the nutrition structure of the existing milk or diary products is inadequate. Many existing methods will damage vitamin C, chlorophyll, SOD and other thermally sensitive materials during the preparation process. In order to overcome those shortcomings particularly change of natural color, loss of nutrients and quality degradation, this invention provides a method of preparing a green milk powder of simple process. This invention provides green milk with natural green elements by combining milk nutrients with nutrients from natural plant and further optimizes nutrition structure and benefits to people. The process of preparing green milk according to this invention will not damage vitamin C, chlorophyll, SOD and thermally sensitive substances; it will keep the nutrition components in natural state and make a naturally beautiful appearance.

In order to resolve some of existing technical problems mentioned above, this invention provides the following. A method of preparing a green milk powder includes the following steps:

a. Pretreatment: when the length of the plant sprout reach 25~45 cm, the plant sprout is cut at 2~5 cm above the ground and then wash soil and impurity away from the plant surface. At room temperature, the plant sprout is first washed by ozonized sterilization running water and then washed by deionized running water and finally crushed.

b. Filtration: juice, filter and extract juice from the crushed plant sprout.

c. Blend: blend uniformity of the juice and the whole milk in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

Preferably, the volume of ozonized water in step (a) is 1~3% of the total volume of water.

Preferably, the blend time condition in step (c) is 10~40 minutes at room temperature.

Preferably, the weight of juice in step (c) is 0.1~40% of weight of the whole milk.

Preferably, concentrating condition in step (d) is as follow: the temperature is 30~40° C., the vacuum degree is 0.08~0.1 MPa, the concentration time is 20~60 minutes, the weight percentage of solid content in concentrated liquid is 10%~30%.

Preferably, the dry process in step (e) uses spray drying and drying in spray drying tower. The drying condition: the hot-blast temperature in tower is 120~160° C., the vacuum degree is 15~25 MPa, and the drying time is 2~10 seconds.

Preferably, the drying process in step (e) uses vacuum freezing drying method or draper-type vacuum method.

Preferably, the plant sprout is one or two or more mixture of barley sprout, wheat sprout, highland barley sprout, buckwheat sprout, black barley sprout, oat seeding sprout, and wild oat seeding sprout.

This invention also provides another preparation method of green milk powder including following steps:

f. Pretreatment: when the plant sprout grows up to 25~45 cm high, the plant sprout is cut at 2~5 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into a natural plant powder.

i. Blend: blend the natural plant powder and a whole milk powder to uniformity by machinery and make it into green milk powder.

The weight of natural plant powder is 0.1~40% of weight of the whole milk powder.

Preferably, the volume of ozonized water in step (f) is 1~3% of the total volume of water.

Preferably, the dry process in step (h) uses spray drying and dry in spray drying tower. The drying condition: the hot-blast temperature in tower is 120~160° C., the vacuum degree is 15~25 MPa, and the drying time is 2~10 seconds.

The invention yields the significant technical outcome through the above method. In this method, green milk with nature green elements combines the nutrition constituents in natural plant and optimizes nutrient structure. The process of preparing green milk powder will not damage vitamin C, chlorophyll, SOD, and thermally sensitive substances and will maintain fine product appearance. The whole preparation process preserves the nutrition constituents in milk and natural plant which are of high nutrition value.

DETAILED DESCRIPTION OF INVENTION

The specific and practical examples below are the further detailed description and illustration to the invention:

Example 1

The method of preparing green milk powder includes following steps:

a. Pretreatment: when the plant sprout grows up to 25 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and a whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) can be 1% of the total volume of water.

The blend time condition in step (c) is 10 minutes at room temperature.

The weight of juice in step (c) can be 0.1% of weight of the whole milk.

The concentrating condition in step (d) is as follows: the temperature is 35° C., the vacuum degree is 0.08 MPa, the concentration time is 40 minutes, and the weight percentage of solid content in concentrated liquid is 10%.

The drying process in step (e) uses spray drying and the drying is carried out in a spray drying tower. The drying condition includes: the hot-blast temperature in tower is 120° C., the vacuum degree is 18 MPa, and the drying time is 3 seconds.

The plant sprout used is barley grass sprout.

The preparation method yields the significant technical outcome. In this method, the green milk with natural green elements combines the nutrition constituents in natural plant and optimizes nutrient structure. The process of preparing green milk powder does not damage vitamin C, chlorophyll, SOD and thermally sensitive substance, and maintains fine product appearance. The whole preparation process preserves the nutrition constituents in milk and natural plant which are of high nutrient value.

The preparation method preserves the activity of many nutrient substances, such as vitamins, active enzymes, chlorophyll, etc. It can also preserve organic, natural and active state, and furthermore preserve the bioactivity of plant nutrient substances and nutrition in milk.

Example 2

The method of preparing green milk powder includes following steps:

a. Pretreatment: when the plant sprout grows up to 30 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and a whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 1% of the total volume of water.

The blend time condition in step (c) is 20 minutes at room temperature.

The weight of juice in step (c) is 0.5% of weight of the whole milk.

The concentrating condition in step (d) includes: the temperature is 35° C., the vacuum degree is 0.08 MPa, the concentration time is 40 minutes, and the weight percentage of solid content in concentrated liquid is 10%.

The drying process in step (e) uses spray drying and dry in spray drying tower. The drying condition includes: the hot-blast temperature in tower is 130° C., the vacuum degree is 18 MPa, and the drying time is 3 seconds.

The plant sprout is wheat grass sprout.

The preparation method yields the significant technical outcome. In this method, the green milk with natural green elements combines the nutrition constituents in natural plant and optimizes nutrient structure. The process of preparing green milk powder does not damage vitamin C, chlorophyll, SOD, thermal sensitive substance and maintains fine product appearance. The whole preparation process preserves the nutrition constituents in milk and natural plant which are of high nutrient value.

This preparation method preserves the activity of many nutrient substances, such as vitamins, active enzymes, chlorophyll, etc. It can also preserve the organic, natural and active state, and further preserve the bioactivity of plant nutrient substances and nutrition in milk.

Example 3

The method of preparing green milk powder includes following steps:

a. Pretreatment: when the plant sprout grows up to 45 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 2% of the total volume of water.

The blend time condition in step (c) is 30 minutes at room temperature.

The weight of juice in step (c) is 1% by weigh of the weight of the whole milk.

The concentrating condition in step (d) includes: the temperature is 40° C., the vacuum degree is 0.09 MPa, concentration time is 30 minutes, and the weight percentage of solid content in concentrated liquid is 20%.

The drying process in step (e) uses vacuum freezing drying.

The plant sprout is barley grass sprout.

The method yields the significant technical outcome. In this method, the green milk with natural green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This preparation method preserves activity of many nutrient substances, such as vitamins, active enzymes, chlorophyll, etc. It can also maintain the organic, natural and active state, and further maintain the bioactivity of plant nutrient substances and nutrition in milk.

Example 4

The method of preparing green milk powder includes following steps:

a. Pretreatment: when the plant sprout grows up to 25 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 1% of the total volume of water.

The blend time condition in step (c) is 10 minutes at room temperature.

The weight of juice in step (c) is 0.8% by weight of weight of the whole milk.

The concentrating condition in step (d) includes the following: the temperature is 30° C., the vacuum degree is 0.08 Mpa, the concentration time is 50 minutes, and the weight percentage of solid content in concentrated liquid is 12%.

The drying process in step (e) uses vacuum freezing drying.

The plant sprout is wheat grass sprout.

The method yields the significant technical outcome. In this method, the green milk with natural green elements combines the nutrition constituents in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This preparation method preserves the activity of many nutrient substances, such as vitamins, active enzymes, chlorophyll, etc. It can also maintain organic, natural and active status, and further maintain the bioactivity of plant nutrient substances and nutrition in milk.

Example 5

The preparation method of green milk powder includes following steps:

a. Pretreatment: when the plant sprout grows up to 25 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 2% of the total volume of water.

The blend time condition in step (c) is 20 minutes at room temperature.

The weight of juice in step (c) is 15% of weight of the whole milk.

The concentrating condition in step (d) includes the following: the temperature is 36° C., the vacuum degree is 0.1 MPa, the concentration time is 40 minutes, and the weight percentage of solid content in concentrated liquid is 28%.

The drying process in step (e) uses vacuum freezing drying.

The plant sprout is barley grass sprout.

The method yields the significant technical outcome. In this method, the green milk with natural green elements combines the nutrition constituent in natural plant and optimizes nutrient structure. The process of preparing green milk powder does not damage vitamin C, chlorophyll, SOD, thermal sensitive substance and maintains fine product appearance. The whole preparation process preserves the nutrition constituents in milk and natural plant which are of high nutrient value.

This method preserves the activity of many nutrient substances, such as vitamins, active enzymes, chlorophyll, etc. It can also maintain organic, natural and active status, and further preserve the bioactivity of plant nutrient substances and nutrition in milk.

Example 6

The method of preparing green milk powder includes following steps:

a. Pretreatment: when the plant sprout grows up to 45 cm, plant sprout is cut at 3 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogenized juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 3% of the total volume of water.

The blend time condition in step (c) is 20 minutes at room temperature.

The weight of juice in step (c) is 20% of weight of the whole milk.

The concentrating condition in step (d) includes the following: the temperature is 37° C., the vacuum degree is 0.1 MPa, the concentration time is 60 minutes, and the weight percentage of solid content in concentrated liquid is 25%.

The drying process in step (e) uses spray drying and drying is carried out in a spray drying tower. The drying condition includes: the hot-blast temperature in tower is 120° C., the vacuum degree is 18 MPa, and the drying time is 3 seconds.

The drying process in step (e) uses vacuum freezing drying.

The plant sprout is wheat grass sprout.

The method yields the significant technical outcome. In this method, the green milk with natural green elements combines the nutrition constituent in natural plant and optimizes nutrient structure. This process of preparing green milk powder does not damage vitamin C, chlorophyll, SOD, thermal sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 7

The method of preparing green milk powder includes following steps:

a. Pretreatment: when the plant sprout grows up to 25 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 1% of the total volume of water.

The blend time condition in step (c) is 10 minutes at room temperature.

The weight of juice in step (c) is 25% of weight of the whole milk.

The concentrating condition in step (d) includes the following: the temperature is 40° C., the vacuum degree is 0.1 MPa, the concentration time is 20 minutes, and the weight percentage of solid content in concentrated liquid is 30%.

The drying process in step (e) uses spray drying and drying is carried out in a spray drying tower. The drying condition: the hot-blast temperature in tower is 140° C., vacuum degree is 20 MPa, and the drying time is 4 seconds.

The plant sprout is the mixture of barley sprout and wheat sprout.

The method yields the significant technical outcome. In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This method preserves the activity of many nutrient substances, such as vitamins, active enzymes, chlorophyll, etc. It can also maintain organic, natural and active status, and further preserve the bioactivity of plant nutrient substances and nutrition in milk.

Example 8

The preparation method of green milk powder includes following steps:

a. Pretreatment: when the plant sprout grows up to 35 cm, the plant sprout is cut at 3 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step a should be 1% of the total volume of water.

The blend time condition in step c is 10 minutes at room temperature.

The weight of juice in step c should be 40% of weight of the whole milk.

The concentrating condition in step (d) include the following: the temperature is 35° C., the vacuum degree is 0.08 MPa, concentration time is 40 minutes, and the weight percentage of solid content in concentrated liquid is 20%.

The drying process in step (e) uses spray drying and dry in spray drying tower. The drying condition includes: the hot-blast temperature in tower is 120° C., the vacuum degree is 15 MPa, and the drying time is 10 seconds.

The plant sprout is high barley sprout.

The method yields the significant technical outcome. In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 9

The method of preparing green milk powder includes following steps:

a. Pretreatment: when the plant sprout grows up to 45 cm, the plant sprout is cut at 3 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 2% of the total volume of water.

The blend time condition in step (c) is 10 minutes at room temperature.

The weight of juice in step (c) is 2% of weight of the whole milk.

Concentrating condition in step (d) is as follows: the temperature is 35° C., the vacuum degree is 0.1 MPa, the concentration time is 35 min, and the weight percentage of solid content in concentrated liquid is 25%.

The drying process in step (e) uses spray drying and dry in spray drying tower. The drying condition: the hot-blast temperature in tower is 130° C., vacuum degree is 18 MPa, and the drying time is 6 seconds.

The plant sprout is the mixture of barley sprout, wheat sprout and highland barley sprout.

The method yields the significant technical outcome. In this method, the green milk with nature green elements combines the nutrition constituent in natural plant and optimizes nutrient structure. The process of green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 10

The method of preparing green milk powder includes following steps:

a. Pretreatment: when the plant sprout grows up to 25 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 3% of the total volume of water.

The blend time condition in step (c) is 10 minutes at room temperature.

The weight of juice in step (c) should be 20% of weight of the whole milk.

Concentrating condition in step (d) is as follows: the temperature is 30° C., vacuum degree is 0.08 MPa, the concentration time is 20 minutes, and the weight percentage of solid content in concentrated liquid is 30%.

The drying process in step (e) uses vacuum freezing drying.

The plant sprout is the mixture of barley sprout and wheat sprout.

The method yields the significant technical outcome. In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active state, and further preserve the bioactivity of plant nutrient substances and nutrition in milk.

Example 11

The method of preparing green milk powder includes following steps:

a. Pretreatment: when the plant sprout grows up to 25 cm, the plant sprout is cut at 3 cm above the ground and then wash soil and impurity away from plant surface. At room temperature, the plant sprout is first washed by ozonized sterilization running water and then washed by deionized running water and finally crushed.

b. Filtration: juice, filter, and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 3% of the total volume of water.

The blend time condition in step (c) is 15 min at room temperature.

The weight of juice in step (c) should be 0.8% of weight of the whole milk.

The concentrating condition in step (d) includes the following: the temperature being 36° C., the vacuum degree is 0.09 MPa, concentration time is 45 minutes, and the weight percentage of solid content in concentrated liquid is 24%.

The drying process in step (e) uses vacuum freezing drying.

The plant sprout is the mixture of barley sprout, wheat sprout, highland barley sprout, buckwheat sprout and black barley sprout.

The method yields the significant technical outcome. In this method, the green milk with nature green elements combines the nutrition constituent in natural plant and optimizes nutrient structure. The process of preparing green milk powder not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 12

The method of preparing green milk powder includes following steps:

a. Pretreatment: when the plant sprout grows up to 25 cm, the plant sprout is cut at 2 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 3% of the total volume of water.

The blend time condition in step (c) is 30 minutes at room temperature.

The weight of juice in step (c) should be 2% of weight of the whole milk.

Concentrating condition in step (d) is as follows: the temperature is 35° C., vacuum degree is 0.09 MPa, concentration time is 50 minutes, and the weight percentage of solid content in concentrated liquid is 25%.

The drying process in step (e) uses spray drying and dry in spray drying tower. The drying condition includes: the hot-blast temperature in tower is 150° C., the vacuum degree is 17 MPa, and the drying time is 3 seconds.

The plant sprout is the mixture of barley sprout, wheat sprout, highland barley sprout, buckwheat sprout, black barley sprout, and oat sprout.

The method yields the significant technical outcome. In this method, the green milk with nature green elements combines the nutrition constituent in natural plant and optimizes nutrient structure. The process of preparing green milk powder not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 13

The method of preparing green milk powder includes following steps:

a. Pretreatment: when the plant sprout grows up to 45 cm, the plant sprout is cut at 5 cm above the ground and then wash soil and impurity away from plant surface. At room temperature, the plant sprout is first washed by ozonized sterilization running water and then washed by deionized running water and finally crushed.

b. Filtration: juice, filter and extract juice from the crushed plant sprout.

c. Blend: blend the juice and the whole milk to uniformity in pre-determined proportion and make it into homogeneous juice.

d. Concentration: evaporate and concentrate the homogeneous juice by evaporator and make it into concentrated liquid.

e. Dry: dry and dispose the concentrated liquid and make it into green milk powder.

The volume of ozonized water in step (a) is 1% of the total volume of water.

The blend time condition in step (c) is 20 min at room temperature.

The weight of juice in step (c) should be 3% of weight of the whole milk.

The concentrating condition in step (d) is as follows: the temperature is 36° C., the vacuum degree is 0.08 MPa, the concentration time is 40 minutes, and the weight percentage of solid content in concentrated liquid is 10%.

The drying process in step (e) uses spray drying and dry in spray drying tower. The drying condition includes: the hot-blast temperature in tower is 150° C., the vacuum degree is 16 MPa, and the drying time is 3 seconds.

The plant sprout is oat sprout.

The method yields the significant technical outcome. In this method, the green milk with nature green elements combines the nutrition constituent in natural plant and optimizes nutrient structure. The process of green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 14

The method of preparing green milk powder includes following steps:

f. Pretreatment: when the plant sprout grows up 25 cm high, the plant sprout is cut at 2 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into natural plant powder.

i. Blend: blend the natural plant powder and a whole milk powder to uniformity by machinery and make it into green milk powder.

The volume of ozonized water in step (f) is 1% of the total volume of water.

The drying process in step (h) uses spray drying and the drying is carried out in spray drying tower. The drying condition includes: the hot-blast temperature in tower is 120° C., the vacuum degree is 20 MPa, and the drying time is 6 seconds.

In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 15

The method of preparing green milk powder includes following steps:

f. Pretreatment: when the plant sprout grows up 25 cm high, the plant sprout is cut at 3 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into a natural plant powder.

i. Blend: blend the natural plant powder and a whole milk powder to uniformity by machinery and make it into green milk powder.

The weight of natural plant powder in step (i) is 1% of weight of the whole milk.

The volume of ozonized water in step (f) is 2% of the total volume of water.

The drying process in step (h) uses spray drying and dry in spray drying tower. The drying condition: the hot-blast temperature in tower is 160° C., vacuum degree is 15 MPa, and the drying time is 4 seconds.

In this method, the green milk with nature green elements combines the nutrition constituent in natural plant and optimizes nutrient structure. The process of green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 16

The method of preparing green milk powder includes following steps:

f. Pretreatment: when the plant sprout grows up to 30 cm high, the plant sprout is cut at 2 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into a natural plant powder.

i. Blend: blend the natural plant powder and a whole milk powder to uniformity by machinery and make it into green milk powder.

The weight of natural plant powder in step (i) should be 10% of weight of the whole milk.

The volume of ozonized water in step (f) is 2% of the total volume of water.

The drying process in step (h) uses spray drying and the drying is carried out in a spray drying tower. The drying condition includes the following: the hot-blast temperature in tower is 150° C., the vacuum degree is 18 MPa, and the drying time is 2 seconds.

In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This technical proposal guarantee activity of many nutrient substances, such as vitamins, active enzymes, chlorophyll, etc. It can also maintain organic, natural and active status, and further maintain the bioactivity of plant nutrient substances and nutrition in milk.

Example 17

The preparation method of green milk powder includes following steps:

f. Pretreatment: when the plant sprout grows up to 45 cm high, the plant sprout is cut at 3 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into green milk powder.

i. Blend: blend the natural plant powder and a whole milk powder to uniformity by machinery and make it into green milk powder.

The weight of natural plant powder in step (i) is 20% of weight of the whole milk.

The volume of ozone in step (f) is 2% of the total volume of water.

The drying process in step h uses spray drying and dry in spray drying tower. The drying condition includes the following: the hot-blast temperature in tower is 140° C., the vacuum degree is 20 MPa, and the drying time is 4 seconds.

In this method, green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process keeps the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 18

The preparation method of green milk powder includes following steps:

f. Pretreatment: when the plant sprout grows up to 45 cm high, the plant sprout is cut at 2 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into a natural plant powder.

i. Blend: blend the natural plant powder and whole milk powder to uniformity by machinery and make it into green milk powder.

The weight of natural plant powder in step (i) is 30% of weight of the whole milk.

The volume of ozonized water in step (f) is 2% of the total volume of water.

The drying process in step (h) uses spray drying and dry in spray drying tower. The drying condition includes the following: the hot-blast temperature in tower is 160° C., vacuum degree is 16 MPa, and the drying time is 2 seconds.

In this method, the green milk with nature green elements combines the nutrition constituent in natural plant and optimizes nutrient structure. The process of preparing green milk powder does not damage vitamin C, chlorophyll, SOD, thermally sensitive substance and maintain fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 19

The method of preparing green milk powder includes following steps:

f. Pretreatment: when the plant sprout grows up to 30 cm high, the plant sprout is cut at 2 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into a natural plant powder.

i. Blend: blend the natural plant powder and a whole milk powder to uniformity by machinery and make it into green milk powder.

The weight of natural plant powder in step (i) is 40% of weight of the whole milk.

The volume of ozonized water in step (f) is 2% of the total volume of water.

The drying process in step h uses spray drying and dry in spray drying tower. The drying condition: the hot-blast temperature in tower is 140° C., vacuum degree is 18 MPa, and the drying time is 3 seconds.

In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

Example 20

The method of preparing green milk powder includes following steps:

f. Pretreatment: when the plant sprout grows up to 45 cm high, the plant sprout is cut at 2 cm above the ground and then wash soil and impurity away from the surface. At room temperature, the plant sprout is first washed by ozonized sterilization running water and then washed by deionized running water, and finally crushed.

g. Filtration: juice, filter, and extract juice from the crushed plant sprout.

h. Dry: dry and dispose the concentrated liquid and make it into a natural plant powder.

i. Blend: blend the natural plant powder and whole milk powder to uniformity by machinery and make it into green milk powder.

The weight of natural plant powder in step (i) is 2% of weight of the whole milk.

The volume of ozone in step (f) is 2% of the total volume of water.

The drying process in step (h) uses spray drying and the drying is carried out in spray drying tower. The drying condition includes the following: the hot-blast temperature in tower is 120° C., the vacuum degree is 15 MPa, and the drying time is 10 second.

In this method, the green milk with nature green elements combines the nutrition constituent in natural plant and optimizes nutrient structure. The process of preparing green milk powder does not damage vitamin C, chlorophyll, SOD, thermally sensitive substance and maintains fine product appearance. The whole preparation process preserves the nutrition constituents in milk and natural plant which are of high nutrient value.

This method preserves activity of many nutrient substances, such as vitamins, active enzymes, chlorophyll, etc. It can also maintain organic, natural and active status, and further preserve the bioactivity of plant nutrient substances and nutrition in milk.

In sum, what are described above are the preferred embodiments of this invention. The coverage of the invention extends to the modification and alteration based on the range of this invention.

The invention claimed is:

1. A method of preparing a green milk powder, comprising the following steps:
   a. pretreatment, comprising
      cutting a plant sprout at 2~5cm above the ground when the plant sprout grows up to 25~45 cm high,
      washing soil and impurity away from the plant sprout surface,
      washing the plant sprout by ozonized sterilization running water, and then washing the plant sprout by deionized running water at room temperature, and crushing the plant sprout;
   b. filtration, comprising juicing, filtering, and extracting juice from the crushed plant sprout;
   c. blend, comprising mixing the juice from step (b) and a whole milk in pre-determined proportion until the mixture becomes a homogeneous juice;
   d. concentration, comprising concentrating the homogeneous juice by evaporation using an evaporator until it becomes a concentrated liquid; and
   e. drying the concentrated liquid and making it into a milk powder;
      wherein the plant sprout is selected from the group consisting of barley sprout, wheat sprout, highland barley sprout, buckwheat sprout, black barley sprout, oat sprout, wild oat sprout, and combinations thereof; and
      wherein the juice in step (c) is 40% by weight of the whole milk.

2. The method according to claim 1, wherein the volume of ozonized water in step (a) is 1~3% of the total volume of water.

3. The method according to claim 1, wherein the blending in step (c) is carried out in time condition in step (c) is 10~40 minutes at room temperature.

4. The method according to claim 1, wherein in step (d), the concentrating is carried out in the condition as follows: the temperature is 30~40° C., the vacuum degree being 0.08~0.1MPa, the concentration time is 20~60 minutes, and the weight percentage of solid content in concentrated liquid is 10%~30%.

5. The method according to claim 1, wherein the drying process in step (e) uses spray drying.

6. The method according to claim 1, wherein the drying process in step (e) uses vacuum freezing drying method or draper-type vacuum method.

7. A method of preparing a green milk powder comprising following steps:
   a. pretreatment, comprising
      cutting a plant sprout at 2~5 cm above the ground when the plant sprout grows up to 25~45 cm high,
      washing soil and impurity away from plant surface,
      washing the plant sprout first with ozonized sterilization running water, and washing the plant sprout by deionized running water at room temperature, and
      crushing the plant sprout;
   b. filtration, comprising juicing, filtering, and extracting juice from the crushed plant sprout;
   c. drying the juice from step (b) and making the concentrated juice into a natural plant powder;
   d. blending the natural plant powder and a whole milk powder or other dairy powder and making the blend into green milk powder, wherein the natural plant powder is 40% by weight of the weight of whole milk powder or other dairy powder;
      wherein the plant sprout is selected from the group consisting of barley sprout, wheat sprout, highland barley sprout, buckwheat sprout, black barley sprout, oat sprout, wild oat sprout, and combinations thereof.

8. The method according to claim 7, wherein the drying process in step (c) uses spray drying.

* * * * *